(12) United States Patent
Herman et al.

(10) Patent No.: US 8,096,389 B2
(45) Date of Patent: Jan. 17, 2012

(54) CABLE CONNECTOR FOR USE IN A BRAKE ACTUATING SYSTEM

(75) Inventors: Ryan Herman, Aurora (CA); Michael Sykes, Orangeville (CA); Peter Revelis, Newmarket (CA)

(73) Assignee: Ventra Group Inc., Ontario (CA)

( * ) Notice: Subject to any disclaimer, the term of this patent is extended or adjusted under 35 U.S.C. 154(b) by 1545 days.

(21) Appl. No.: 11/239,235

(22) Filed: Sep. 30, 2005

(65) Prior Publication Data

US 2007/0151811 A1 Jul. 5, 2007

(51) Int. Cl.
*F16D 65/14* (2006.01)

(52) U.S. Cl. .................. 188/2 D; 188/204 R; 74/502.6; 403/300

(58) Field of Classification Search .................. 188/2 D, 188/204 R; 74/502.6; 384/280, 276
See application file for complete search history.

(56) References Cited

U.S. PATENT DOCUMENTS

| | | | |
|---|---|---|---|
| 1,368,117 A * | 2/1921 | Claude | 278/96 |
| 2,937,540 A | 5/1960 | Claus | |
| 3,194,085 A * | 7/1965 | Kirk | 74/540 |
| 3,459,065 A * | 8/1969 | Fender | 74/529 |
| 3,842,950 A * | 10/1974 | Fontaine | 188/170 |
| 3,974,713 A | 8/1976 | Toohey | |
| 4,095,316 A * | 6/1978 | Gabriel | 24/599.1 |
| 4,129,045 A * | 12/1978 | Kishitani | 474/231 |
| 4,227,603 A * | 10/1980 | Fasano | 192/70.252 |
| 4,263,999 A | 4/1981 | Fasano | |
| 4,391,159 A | 7/1983 | Sellmeyer | |
| 4,440,269 A * | 4/1984 | Harriott | 188/196 F |
| 4,515,036 A | 5/1985 | Dotson | |
| 4,533,276 A * | 8/1985 | Stidham | 403/165 |
| 4,612,823 A | 9/1986 | De Leeuw et al. | |
| 4,819,501 A | 4/1989 | Kraus et al. | |
| 4,872,368 A * | 10/1989 | Porter | 74/542 |
| 5,001,942 A | 3/1991 | Boyer | |
| 5,120,195 A * | 6/1992 | Schmaling et al. | 416/134 A |
| 5,139,126 A | 8/1992 | Perez et al. | |
| 5,211,072 A | 5/1993 | Barias et al. | |
| 5,230,410 A * | 7/1993 | Yamamuro | 192/223.4 |
| 5,280,734 A | 1/1994 | Riffle et al. | |
| 5,309,786 A | 5/1994 | Pare et al. | |
| 5,467,666 A | 11/1995 | Soucie et al. | |
| 5,546,828 A | 8/1996 | Golarz | |
| 5,555,773 A | 9/1996 | Nanno et al. | |
| 5,758,547 A | 6/1998 | Smale | |
| 5,971,651 A * | 10/1999 | Gornick et al. | 403/79 |
| 6,282,980 B1 | 9/2001 | Sykes | |
| 6,286,389 B1 | 9/2001 | Papadatos | |
| 6,902,341 B1 * | 6/2005 | Rauschert | 403/43 |
| 7,093,695 B1 * | 8/2006 | Boyle | 188/2 D |
| 2002/0011749 A1 * | 1/2002 | Janz | 297/482 |
| 2003/0024773 A1 * | 2/2003 | Goncalves et al. | 188/1.11 E |

* cited by examiner

*Primary Examiner* — Robert Siconolfi
*Assistant Examiner* — James Hsiao
(74) *Attorney, Agent, or Firm* — Pillsbury Winthrop Shaw Pittman LLP (57) ABSTRACT

The present application discloses a cable connector for use in attaching an input cable to an actuator in a vehicle braking system.

22 Claims, 7 Drawing Sheets

CABLE CONNECTOR FOR USE IN A BRAKE ACTUATING SYSTEM

FIELD OF THE INVENTION

The present invention relates to a cable connector for use in attaching an input cable to an actuator in a vehicle brake actuating system.

BACKGROUND OF THE INVENTION

In many brake actuators, the input cable for the cable system is attached to an output member of the actuator by using a pivoted clevis that receives an enlarged head on the proximal end of the input cable. One particular shortcoming of this approach is the expense of providing the clevis and attaching it to the output member. Also, the clevis presents a situation where the enlarged head may become dislodged. However, the use of this approach does have some advantages. Specifically, the pivotal mounting of the clevis enables it to adjust itself as the output member rotates so that it is in line with the input cable.

The invention of the present application endeavors to provide an improved and/or more cost-effective construction for connecting an input cable to the output member of a brake actuator.

SUMMARY OF THE INVENTION

One aspect of the invention provides a cable connector with a wear protector for use in a brake actuating system in a motor vehicle having brakes that are actuated to prevent vehicle wheel rotation and hence rolling movement of the vehicle. The brake actuating system comprises (a) an actuator including a metal output member movable in a brake applying direction and a brake releasing direction, the metal output member including a surface defining a receiving space; and (b) a cable system operatively connected to the brakes such that increasing tension in the cable system actuates the brakes, and then decreasing tension in the cable system de-actuates the brakes. The cable system includes an input cable. The cable connector comprises a cable connector portion constructed to be connected to a proximal end of the input cable, and an actuator connector portion connected to the cable connector portion so as to extend generally transversely to a longitudinal extent of the input cable when the cable connector portion is connected to the input cable. A wear protector is attached to the actuator connector portion and is formed of a wear resistant material. The cable connector is constructed to operatively connect the input cable to the actuator to enable movement of the output member in the brake applying and releasing directions thereof to increase and decrease the tension in the cable system via the input cable. This is done by the actuator connector portion being received in the receiving space of the output member with the wear protector in engagement with the surface defining the receiving space of the output member to enable relative movement between the actuator connector portion and the output member as the output member is moved in the brake applying and releasing directions thereof.

Another aspect of the invention provides a brake actuating system with a wear protector for use in a motor vehicle having brakes that are actuated to prevent vehicle wheel rotation and hence rolling movement of the vehicle. The vehicle has a cable system operatively connected to the brake system such that increasing tension in the cable system actuates the brakes, and then decreasing tension in the cable system de-actuates the brakes. The brake actuating system comprises an actuator including a metal output member movable in a brake applying direction and a brake releasing direction, the metal output member including a surface defining a receiving space. An input cable of the actuating system has a proximal end and a distal end. The brake actuating system also comprises an output side cable connector and an input side cable connector.

The output side cable connector is connected to the distal end of the input cable and is constructed to operatively connect the input cable to the cable system of the vehicle. The input side cable connector includes a cable connector portion connected to the proximal end of the input cable, and an actuator connector portion extending generally transversely to a longitudinal extent of the input cable. The input side cable connector also includes a wear protector attached to one of the actuator connector portion and the surface defining the receiving space on the output member. The wear protector is formed of a wear resistant material. The input side cable connector is constructed to operatively connect the input cable to the actuator to enable movement of the output member in the brake applying and releasing directions thereof to increase and decrease the tension in the cable system via the input cable and the output side cable connector when the output side cable connector operatively connects the input cable to the cable system as aforesaid. This is done by the actuator connector portion being received in the receiving space of the output member with the wear protector in engagement with the other of the actuator connector portion and the surface defining the receiving space on the output member. This enables relative movement between the actuator connector portion and the output member as the output member is moved in the brake applying and releasing directions thereof.

Yet another aspect of the invention provides a brake actuating system with a wear protector in combination with a motor vehicle having brakes that are actuated to prevent vehicle wheel rotation and hence rolling movement of the vehicle. The brake actuating system in this combination comprises an actuator including a metal output member movable in a brake applying direction and a brake releasing direction. The metal output member includes a surface defining a receiving space. The brake actuating system also comprises a cable system operatively connected to the brakes such that increasing tension in the cable system actuates the brakes, and then decreasing tension in the cable system de-actuates the brakes. The cable system includes an input cable. A cable connector includes a cable connector portion connected to a proximal end of the input cable, and an actuator connector portion extending generally transversely to a longitudinal extent of the input cable. The cable connector also includes a wear protector attached to one of the actuator connector portion and the surface defining the receiving space. The wear protector is formed of a wear resistant material. The cable connector operatively connects the input cable to output member of the actuator to enable movement of the output member in the brake applying and releasing directions thereof to increase and decrease the tension in the cable system via the input cable. This is done by the actuator connector portion being received in the receiving space of the output member with the wear protector in engagement with the other of the actuator connector portion and the surface defining the receiving space. This enables relative movement between the actuator connector portion and the output member as the output member is moved in the brake applying and releasing directions thereof.

Yet another aspect of the present invention provides a brake actuating system in combination with a motor vehicle. The brake actuating system comprises a cable system operatively connected to the brakes such that increasing tension in the cable system actuates the brakes, and then decreasing tension in the cable system de-actuates the brakes. The cable system including an input cable. The system also comprises a cable connector including a cable connector portion connected to a proximal end of the input cable, and an actuator connector portion extending generally transversely to a longitudinal extent of the input cable. An actuator includes an output member movable in a brake applying direction and a brake releasing direction. The output member includes a receiving space having (a) a connector receiving portion having first and second ends and (b) an entry portion having first and second ends. The second end of the entry portion is open to the connector receiving portion, and the receiving space is configured to enable the actuator connector portion to be passed into the first end of the entry portion and then through the second end thereof into the connector receiving portion. At least the second end of the connector receiving portion is spaced from the second end of the entry portion. The cable connector operatively connects the input cable to the output member of the actuator to enable movement of the output member in the brake applying and releasing directions thereof to increase and decrease the tension in the cable system via the input cable with the actuator connector portion engaging the first end of the connector receiving portion as the output member is moved in the brake applying and releasing directions thereof.

Yet another aspect of the invention provides a brake actuating system comprising an input cable having a proximal end and a distal end, and an output side cable connector connected to the distal end of the input cable and being constructed to operatively connect the input cable to the cable system of the vehicle. An input side cable connector includes a cable connector portion connected to the proximal end of the input cable, and an actuator connector portion extending generally transversely to a longitudinal extent of the input cable. An actuator includes an output member movable in a brake applying direction and a brake releasing direction. The output member includes a receiving space having (a) a connector receiving portion having first and second ends and (b) an entry portion having first and second ends. The second end of the entry portion is open to the connector receiving portion, and the receiving space is configured to enable the actuator connector portion to be passed into the first end of the entry portion and then through the second end thereof into the connector receiving portion. At least the second end of the connector receiving portion is spaced from the second end of the entry portion. The input side cable connector is constructed to operatively connect the input cable to the actuator to increase and decrease the tension in the cable system via the input cable and the output side cable connector with the actuator connector portion engaging the first end of the connector receiving portion as the output member is moved in the brake applying and releasing directions thereof.

Yet another aspect of the invention relates to a retainer mounted to the actuator and having a retainer member constructed to enable inward movement of the actuator connector portion through the entry portion and into the connector receiving portion and into the connector receiving portion, and to resist outward movement of the actuator connector portion from the connector receiving portion through the entry portion.

Other objects, features, and aspects of the invention will become apparent from the following detailed description, the accompanying drawings, and the appended claims.

DETAILED DESCRIPTION OF THE ILLUSTRATED EMBODIMENTS

Figure 1:
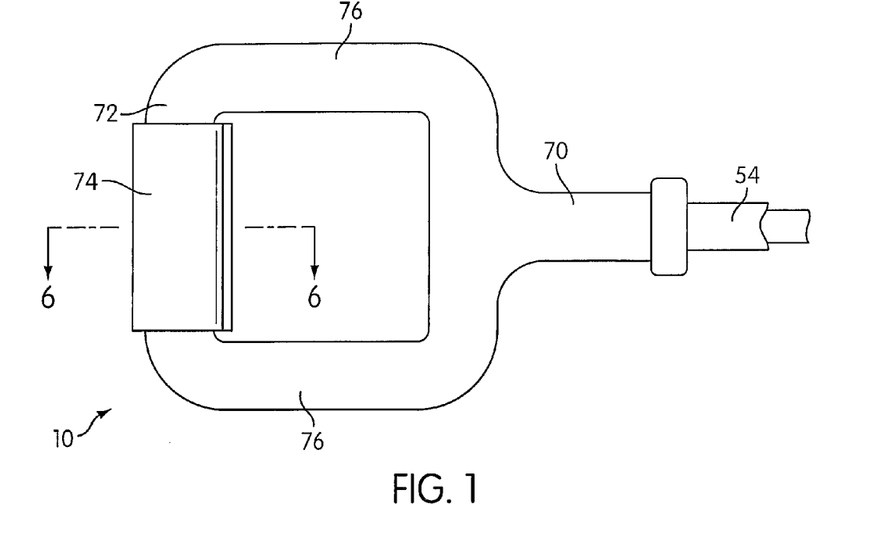
FIG. 1 is a plan view of one embodiment of a cable connector constructed according to the present invention.
Figure 3:
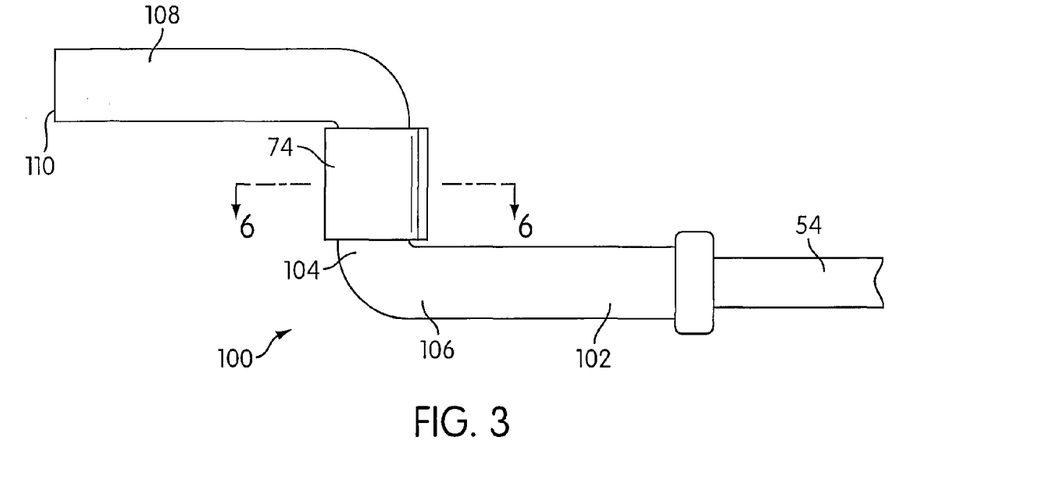
FIG. 3 is a plan view of another embodiment of a cable connector constructed in accordance with the present invention.
Figure 4:
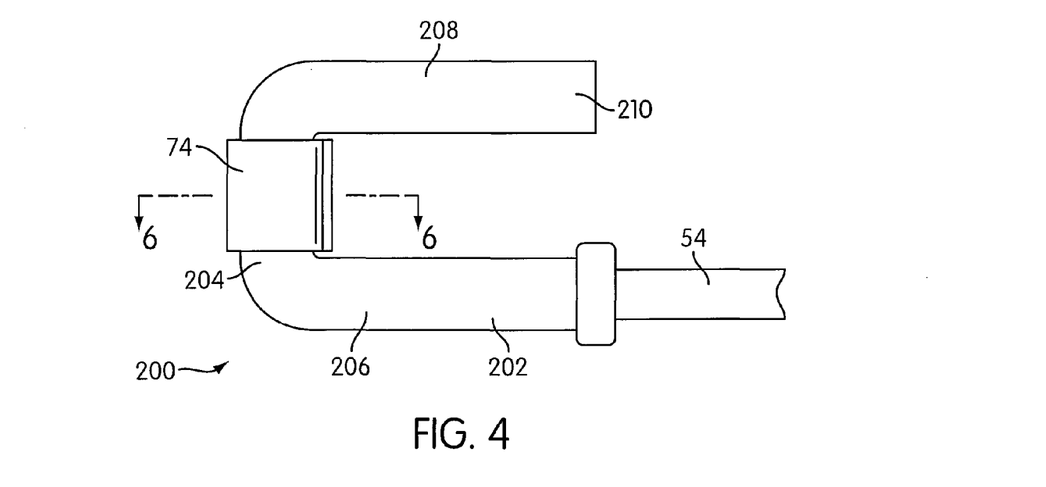
FIG. 4 is a plan view of yet another embodiment of a cable connector constructed in accordance with the present invention.

FIG. 1 illustrates a cable connector 10 that is designed to be used in a brake actuating system 12, and FIGS. 3 and 4 illustrate alternative connectors 100, 200. The brake actuating system 12 is illustrated schematically in FIG. 8 in a motor vehicle 14 that has brakes 16 that are actuated to prevent rotation of vehicle wheels 17 and hence rolling movement of the vehicle 14.

The brake actuating system 12 comprises an actuator 18 that may be of any type, and may be either power-operated, hand-operated (i.e., by a hand lever mounted adjacent the driver's seat in the passenger compartment), or foot-operated (i.e., by a pedal assembly mounted beneath the dashboard in front of the driver's seat). Such an actuator 18 includes a metal output member 20 movable in a brake applying direction and a brake releasing direction. In the figures, and particularly FIGS. 2 and 5, the actuator 18 is of the hand-operated type including a lever 24 that pivotally mounts to a fixed mounting bracket (not shown) by passing a rivet or other fastener (not shown) through an opening 26. In the illustrated embodiment, the metal output member 20 is constituted by the main body 28 of the lever 24, and an elongated arm member 30 extends forwardly therefrom. The lever 24 shown is stamped from one piece of sheet metal, which is preferably but not necessarily heat treated steel.

Figure 2:
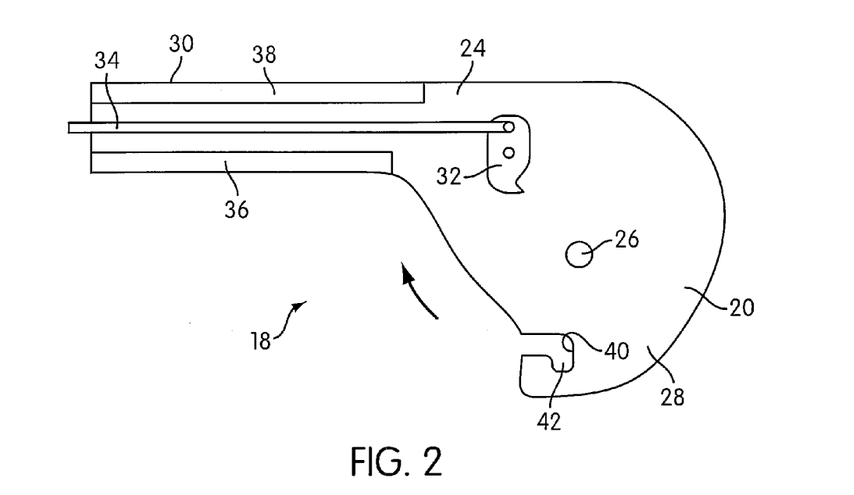
FIG. 2 is a profile view of an exemplary actuator lever with which the cable connector of FIG. 1 can be used.
Figure 5:
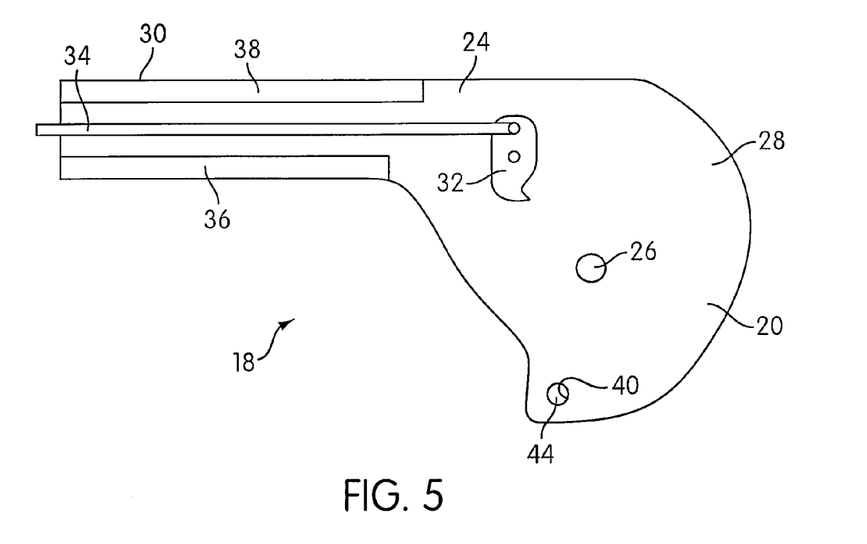
FIG. 5 is profile view of an exemplary actuator lever with which the cable connectors of FIGS. 3 and 4 can be used.

The lever 24 illustrated is mostly conventional and need not be described in detail. FIGS. 2 and 5 illustrate essentially the same lever 24, with the exception of the manner in which the cable connection is made, and thus common reference numerals will be used between the two Figures. As is conventional, the lever 24 carries a pivotally mounted pawl 32. The pawl 32 engages a sector having gear teeth arranged concentrically with respect to the pivot axis of the lever 24. This sector is usually provided on the fixed mounting bracket, and is not shown. A rigid rod 34 is received between two integrally formed walls 36, 38 of the arm member 30 and is connected to the pawl 32. Typically, molded plastic (not shown) is formed around the arm portion 30 for aesthetic purposes and a molded plastic hand grip (not shown) is molded on the distal free end thereof. A push button (not shown) is slidably mounted in the hand grip and engages the distal end of the rod 34. One or more springs may be provided to bias the pawl 32 into engagement with the gear teeth, and as the lever 24 is pivoted upwardly in a brake applying direction, the pawl 32 will ratchet over those teeth and then maintain the lever 24 in place at the selected position. Thereafter, the lever 24 may be released by pushing the button inwardly to move the rod 34 to the right as shown in FIG. 2 to disengage the pawl 32 from the teeth, and thus allow for return of the lever 24 in the brake releasing direction to its home position.

The lever 24, and the brake actuator 18 in general, may have any suitable construction or configuration and the one illustrated is in no way intended to be limiting. To the contrary, the lever 24 and actuator 18 described herein is only being provided as context for describing the cable connector and the manner in which it connects to the actuator. Any actuator having any type of output member that moves and to which a cable connector may be connected may be used. Thus, while continued reference may be made to the illustrated actuator 18 and lever 24, this is for context only.

The output member provided by the main body 28 includes a metal engagement surface 40 defining a receiving space. Materials other than metal could be used, but metal is generally preferred. In the embodiment of FIG. 2, the receiving space is a recess 42 with an internal surface of the recess 42 providing the engagement surface 40; and in the embodiment of FIG. 5 the receiving space is an opening 44 with an internal surface of the opening 44 providing the engagement surface 40. Generally, the receiving space may have any construction or configuration and the ones illustrated are not intended to be limiting.

The brake actuating system 12 also includes a cable system 50 that is operatively connected to the brakes 16 such that increasing tension in the cable system 50 actuates the brakes 16, and then decreasing tension in the cable system 50 de-actuates the brakes 16. The cable system includes a plurality of flexible cables slidably received in flexible conduits. These cable/conduit constructions are often referred to as Bowden cables. Typically, these cables are nylon coated steel and will include a relatively short input cable 54 that is connected at its proximal end to the actuator 18 in a manner to be described below by a cable connector 10, 100, 200, and at its distal end to an equalizer 56. These cables will also include a pair of relatively longer cables 58, 60 that are connected between the equalizer 56 and the vehicle brakes 16. These connections enable movement of the output member 20 of the actuator 18 in the brake applying and releasing directions to increase and decrease the tension in the cable system 50. The equalizer 56 functions to distribute tension that is applied to the input cable 54 essentially equally to the cables 58, 60. However, any other suitable output side connector member may be provided to operatively connect the distal end of the input cable 54 to the remainder of the cable system 50.

With respect to the input cable 54, the cable connectors 10, 100, 200, or any other connector on its proximal end, may be referred to as an input side cable connector, and the equalizer or any other connector on its distal end may be referred to as an output side cable connector.

Generally, the cable system 50 illustrated is of conventional construction and may have any suitable construction or configuration. As was the case with the actuator 18, the construction illustrated for the cable system 50 is in no way intended to be limiting. To the contrary, the cable system 50 described herein is only being provided as context for describing the cable connector and the manner in which it connects to the actuator.

With reference to the cable connector 10 illustrated in FIG. 1, the connector 10 comprises a cable connector portion 70 constructed to be connected to a proximal end of an input cable 54, and an actuator connector portion 72 connected to the cable connector portion 70 so as to extend generally transversely to a longitudinal extent of the input cable 54 when the cable connector portion 70 is connected to the input cable 54 (i.e., referring to the extent of the input cable 54 when it is taut).

While the actuator connector portion 72 is described as extending generally transversely to the input cable 54, this does not limit the actuator connector portion 72 to being a straight member. Instead, the actuator connector portion 72 could be entirely curved, such as the bight of a U, or it could also be straight. With a curved configuration, it will still have a directional component in the generally transverse direction.

To connect the cable 54 to the cable connector portion 70, the end of the cable 54 is inserted inside the hollow interior of the cable connector portion 70. The cable connector portion 70 is then crushed/compressed to mechanically secure it to the cable 54. Any other suitable connection may be used.

At least the actuator connector portion 72 is formed of a metal having a first hardness. A wear protector 74 is attached to the actuator connector portion 72 and is formed of a material preferably having a second hardness greater than or equal to the first hardness of the actuator connector portion 72. The cable connector 70 is constructed to operatively connect the input cable 54 to the actuator to enable movement of the output member 20 in the brake applying and releasing directions thereof to increase and decrease the tension in the cable system 50 via the input cable 54. This is done by the actuator connector portion 72 being received in the receiving space of the output member 20 with the wear protector 74 in surface sliding engagement with the engagement surface 40 to enable relative movement between the actuator connector portion 72 and the output member 20 as the output member 20 is moved in the brake applying and releasing directions thereof.

The connector 10 of FIG. 1 is designed for use with a lever having a recess, such as the recess 42 in the lever 24 of FIG. 2. The connector 10 has two arms 76 with spaced apart ends connected to opposing ends of the actuator connector portion 72. The opposite ends connect to the cable connector portion 70. Preferably, the actuator connector portion 72, the cable connector portion 70, and the arms 76 are formed integrally as one piece of metal. The forming may be by an operation such as forging or casting, or by any other suitable method.

To use the connector 10 to connect the input cable 54 to the output member 20, the actuator connector portion 72 is inserted into the open end of the recess 42 and seated generally transversely in the area of the end of the recess 42 with the arms 76 on opposing sides of the output member 20. As tension is placed on the cable 54, the wear protector 74 is engaged with the engagement surface 40 defining the recess 42. As the lever 24 is pulled in the brake applying direction (clockwise as shown in FIG. 2), the connector 10 will pivot within the recess 42. The presence of the wear protector 74 will protect the softer metal at the actuator connector portion 72 from being worn down by the harder metal of the output member 20 at the engagement surface 40.

Preferably, the wear protector 74 is made of a metal having essentially the same hardness as the metal of the engagement surface 40. By matching the hardness, wear between the protector 74 and the surface 40 can be reduced.

In the illustrated embodiment, because the output member 20 may be made of heat treated steel, and the cable connector 10 is made of softer forged or die cast steel, using the harder wear protector 74 will prevent the engagement surface 42 of the output member 20 from wearing down the actuator connector portion 70 of the cable connector 10. It should be understood that the invention is not limited to these specific materials, and others may be used.

Also, instead of mounting the wear protector to the actuator connector portion 72, it could be mounted on the surface 40 defining the receiving space 42.

Figure 6:
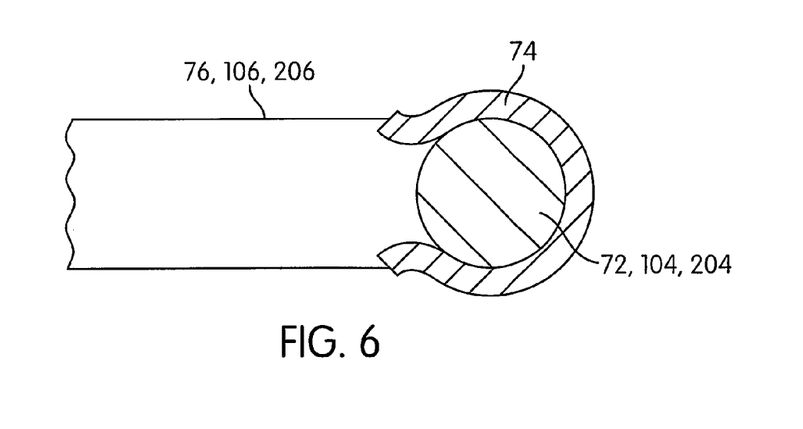
FIG. 6 is cross-sectional view taken through line 6-6 in any one of FIGS. 1, 3 and 4.
Figure 7:
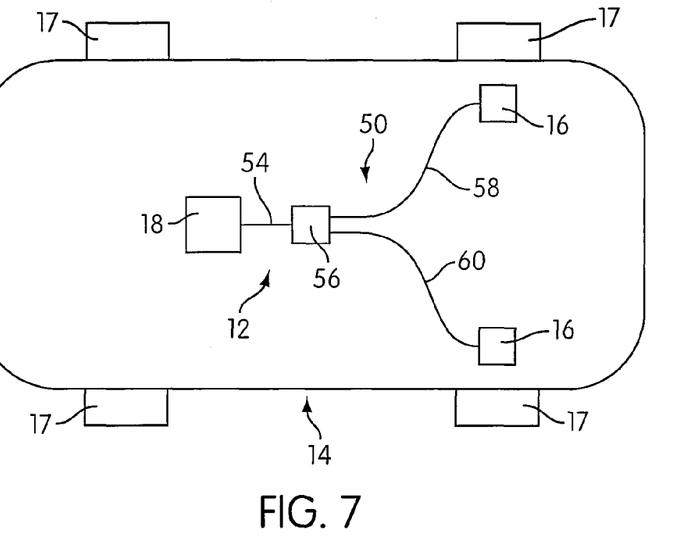
FIG. 7 is a schematic view of a motor vehicle brake system.

In the illustrated embodiment, the wear protector 74 is a resilient clip having a generally C-shaped cross-section. This clip preferably is formed of spring steel heat treated to match the hardness of the output member 20. As can be appreciated from the cross-section of FIG. 6, the clip is snapped onto the actuator connector portion 72 of the connector 10. This construction is preferred because relatively it is relatively simple to assemble.

Alternatively, other constructions or materials may be used. For example, the wear protector 74 could be welded or otherwise affixed to the actuator connector portion 72. Also, the wear protector 72 could be a high hardness polymeric coating or film. However, while such alternatives are within the scope of the invention, the illustrated clip-type wear protector 74 is preferred because of its lower cost and ease of assembly. Alternatively, to reduce wear, low friction materials may be employed, such a TEFLON coating or film, or other materials.

The connectors 100, 200 of FIGS. 3 and 4 are designed for use with a lever having an opening, such as the opening 44 in the lever 24 of FIG. 5. Each of the connectors 100, 200 has a cable connector portion 102, 202 constructed to be connected to a proximal end of an input cable 54. The cable connector portions 102, 202 may have the same construction as cable connector portion 70, and may be connected to the input cable 54 as described above with respect to cable connector portion 70. Each connector 100, 200 also comprises an actuator connector portion 104, 204 connected to the cable connector portion 104, 204 so as to extend generally transversely to a longitudinal extent of the input cable 54.

Each connector 100, 200 has a single arm 106, 206 with one end connected to the actuator connector portion 104, 204 and its opposite end connected to the cable connector portion 102, 202. In each of the connectors 100, 200, the opposite end of the actuator connector portion 104, 204 is connected to the end of another arm 108, 208. This arm 108, 208 has a free end 110, 210. This free end 110, 210 can be inserted into the opening 44 on the output member 20 to enable the actuator connector portion 104, 204 to be received therein generally transversely.

The primary difference between the embodiments of FIGS. 3 and 4 is that the free arm 108 of connector 100 extends away from the cable connector portion 102, whereas the free arm 208 of connector 200 extends back towards the connector portion 202. Either variation may be used. Moreover, any other suitable construction or configuration may be used for the cable connector.

Like the embodiment of FIG. 1, the actuator connector portions 104, 204 of connectors 100, 200 are formed of a metal having a first hardness. The same wear connector 74 described above with respect to FIG. 1 may be attached to the actuator connector portions 104, 204 in the same type of snap-on manner (see FIG. 6). Like the embodiment of FIG. 1, in the embodiments of FIGS. 3 and 4, the wear connector 74 would also have a hardness that is greater than or equal to the hardness of the respective actuator connector portion 104, 204 to which it is attached. Likewise, the same variations for the wear protector 74 discussed above with respect to FIG. 1 may be applied to the embodiments of FIGS. 3 and 4.

To use either of connectors 100, 200 to connect the input cable 54 to the output member 20, the free end of either free arm 108, 208 is inserted into the opening 44 so that the actuator connection portion 104, 204 is received generally transversely in the opening. The configuration of the free arm 108, 208 will help prevent lateral withdrawal of the actuator connector portion 104, 204 from the opening 44. In this position, the wear protector engages the engagement surface 40 defining the opening. As was the case with the embodiment of FIG. 1, as the lever 24 is pulled in the brake applying direction (clockwise as shown in FIG. 5), the connector 100, 200 will pivot within the opening 44 with the wear protector 74 in surface sliding engagement with the engagement surface 40. The wear protector 74 will protect wear from occurring, similarly to the embodiment of FIG. 1.

Figure 8A:
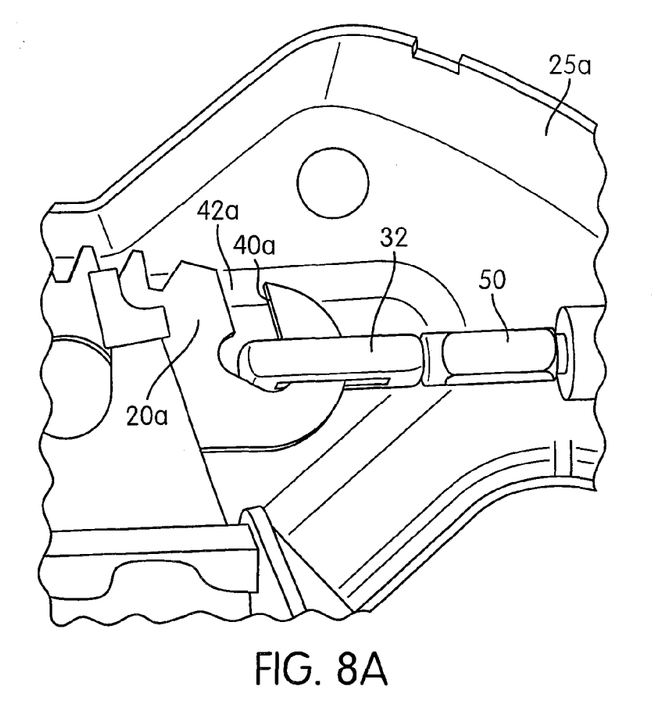
FIGS. 8A-8C profile views of an exemplary foot brake actuator with which the cable connectors described herein may be used, and components thereof.
Figure 8B:
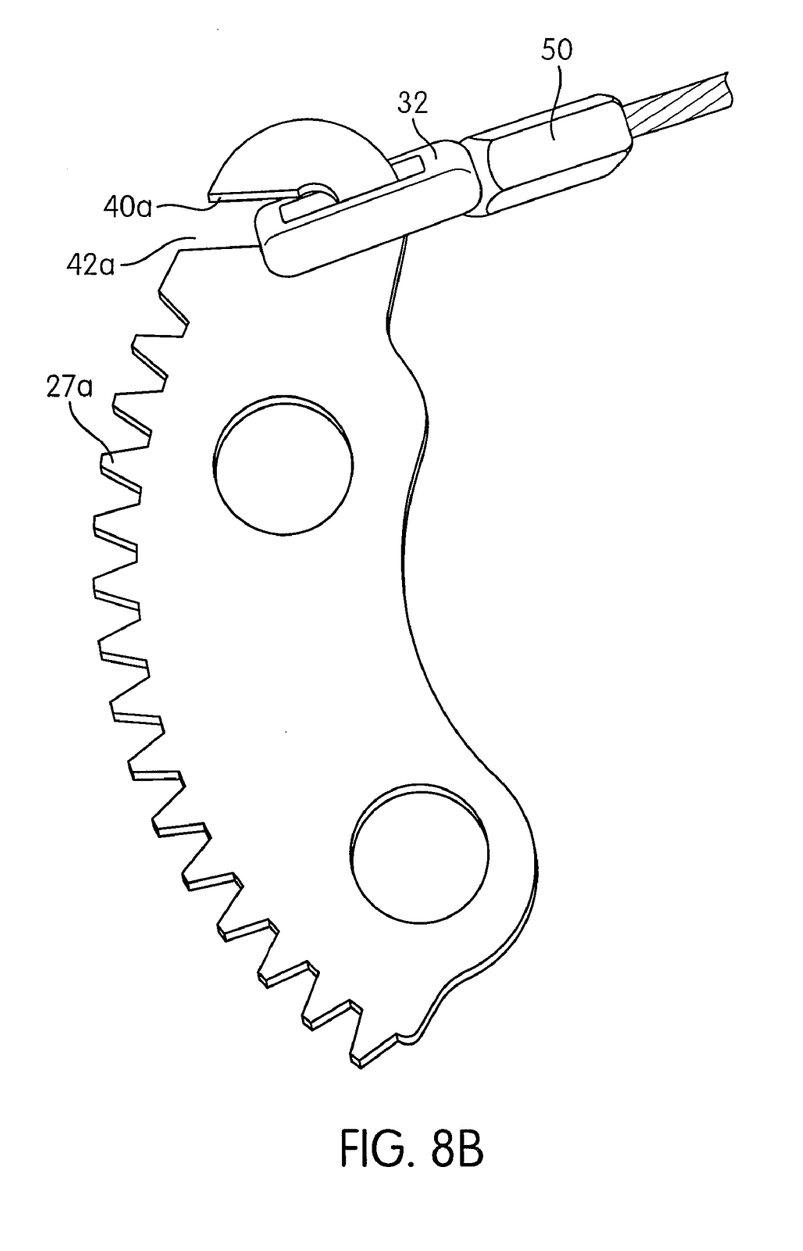
Figure 8C:
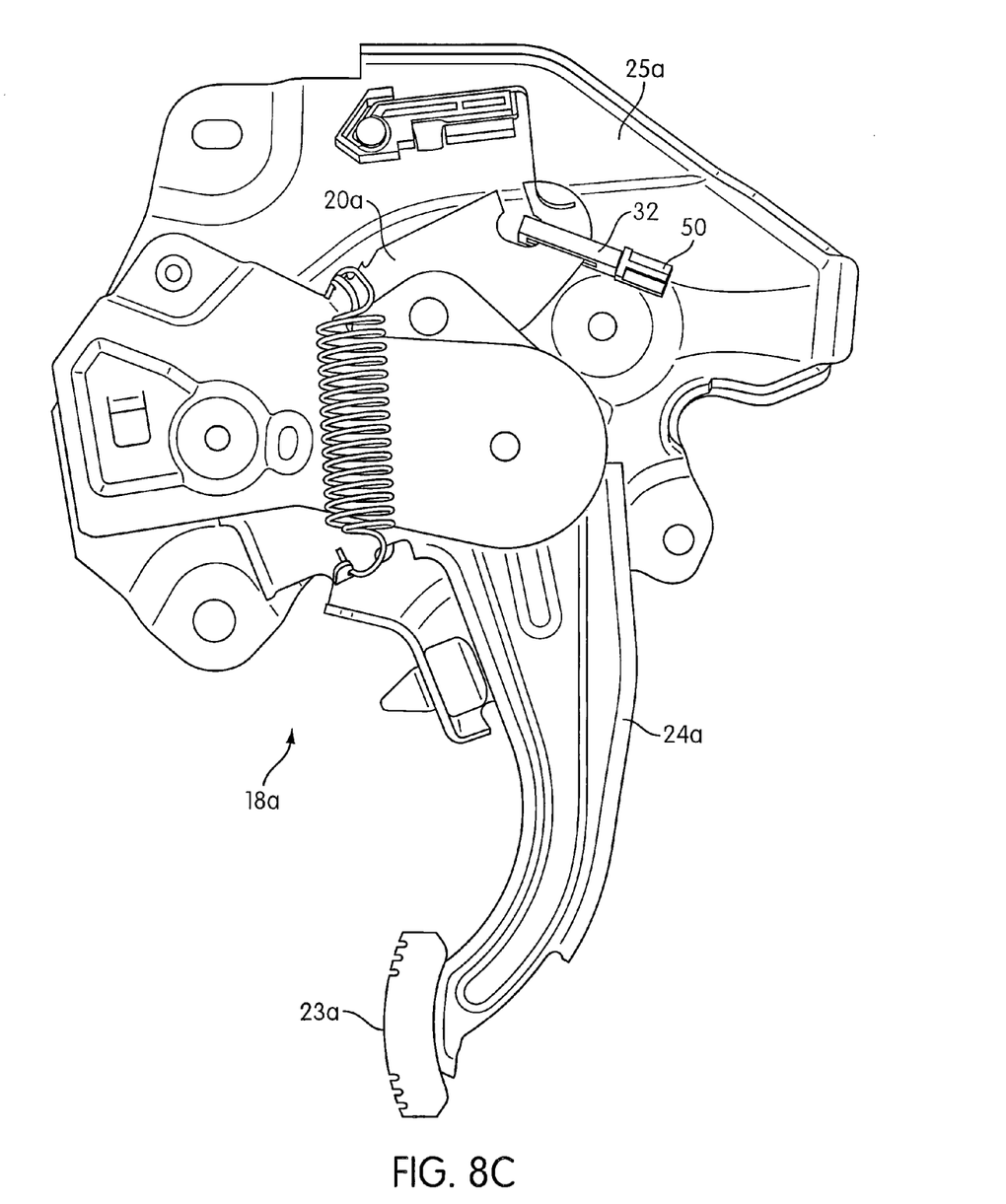

FIG. 8C is a profile view of a foot brake actuator 18a, which includes a movable output member 20a and a pedal lever 24a. FIGS. 8A and 8B show close-up profile views of various components. To the extent the reference numbers in this embodiment correspond to those used in the previously described embodiments, with the exception of an "a" being added, they denote corresponding structure.

The output member 20a (shown as a stamped metal piece with openings for receiving rivets) is fixed to the upper end of the lever 24a and the lever 24a is pivoted to a bracket 25a that mounts in the vehicle (i.e., to the front wall of the passenger compartment of the vehicle beneath the dashboard). A pedal pad 23a is provided on the distal and of the lever 24a for engagement by the user's foot. The output member 20a has sector teeth 27a that are engaged by a pawl (not shown, but which is attached to the mounting bracket and actuatable in a manner well known in the art) in a ratcheting action to releasably maintain the lever 24 in a brake-applied position.

The end of the output member 20a has the surface 40a defining a receiving space in the form of recess 42a. The actuator connector portion 72 of the cable connector 50 is received in that recess 42a, similarly to the embodiments described above. Likewise, an opening similar to opening 44 described above may also be used. Generally, a foot brake actuator is the more common environment to find the attachment described herein, but it is mechanically possible to use it for either hand, foot, or power-operated actuators.

The inventor is not limited to the actuators depicted, and the invention may be practiced with any suitable actuator.

Figure 9:
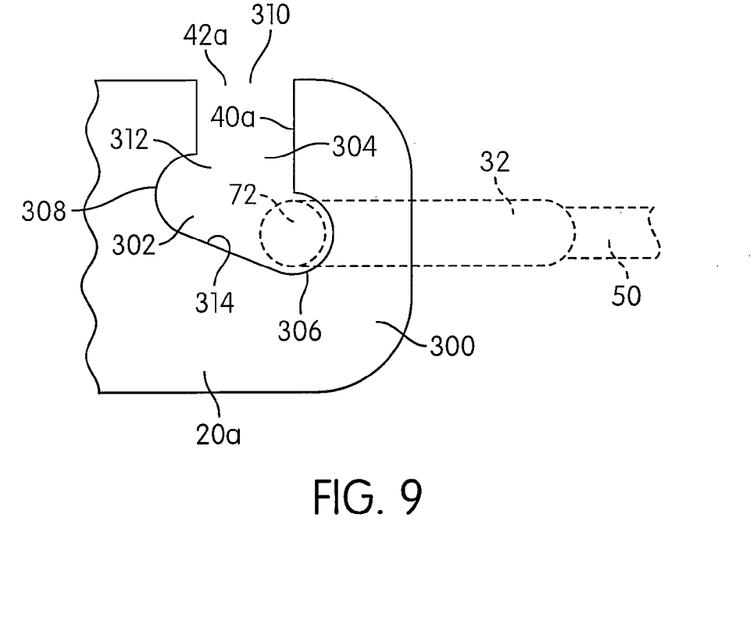
FIG. 9 is a close-up of a receiving space that receives an actuator connector portion.

FIG. 9 shows a close-up of the structure in FIG. 8a where the cable connector 50 attaches to the output member 20a. The end of the output member 20a is formed somewhat like a hook 300, but any suitable shape may be used.

The receiving space 42a has a connector receiving portion 302 and an entry portion 304. The connector receiving portion is generally elongated and has opposing first and second ends 306, 308, respectively. The entry portion 304 is also generally elongated and has opposing first and second ends 310, 312, respectively.

The second end 312 of the entry portion 304 is open to the connector receiving portion 302, and the first end 310 is open to the edge of the output member 20a. Thus, the receiving space 42a, and particularly the connector receiving and entry portions 302, 304, is configured to enable the generally transverse actuator connector portion 72 to be passed into the first end 310 of the entry portion 304 and then through the second end 312 thereof into the connector receiving portion 302.

As can be seen in FIG. 9, at least the second end 308 of the connector receiving portion 302 is spaced from the second end 312 of the entry portion 304. This enables the actuator connector portion 32 to travel within the connector receiving portion 302 without moving up into the entry portion 304, and possibly disconnecting. This is desirable because in some instances, such as during servicing, the cable may be moved in that manner. Likewise, if there is some lag in the brake(s) releasing when the lever is being moved in the releasing direction, there may be some relative movement of the actuator connector portion 32 towards that second end 308. Spacing the second end 300 of the connector receiving portion 302 creates a recess or region where the actuator connector portion 32 can move past the second end 312 of the entry portion 304. Preferably, the second end 308 is rounded to match the generally circular cross-section of the actuator connector portion 32.

The edge or surface 314 of the connector receiving portion 302 opposite the entry portion 304 may be angled as shown to guide the actuator connector portion 32 into the second end 308.

Also, the first end 306 of the connector receiving portion 302 may be spaced from the second end 312 of the entry portion 304. It may also be rounded to match the generally circular cross-section of the actuator connector portion 32. This optional configuration provides a recessed area for the actuator connector portion 32 to pivot as the lever is moved in its applying and releasing directions.

The geometry illustrated in FIG. 9 need not be used with the wear protector described before, but it may be.

Figure 10:
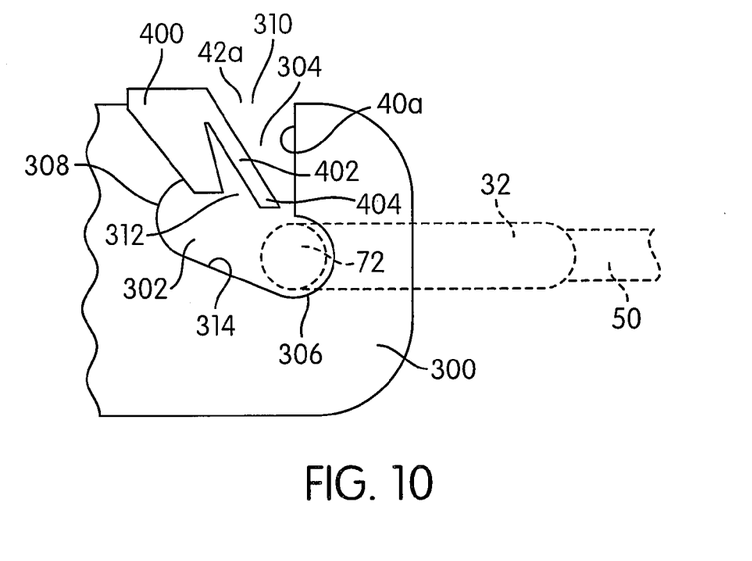
FIG. 10 is a view similar to claim 9, but with a retainer attached.

FIG. 10 shows an alternative embodiment where a retainer 400 is used. The retainer 400 is used on the same structure shown in FIG. 9, but may be used on any shape or construction. For convenience, the common structures between FIGS. 9 and 10 will use the same reference numbers. The retainer 400 is mounted to the actuator, and specifically to the portion that defines one side of the entry portion 304.

The retainer 400 has a retainer member 402 constructed to enable inward movement of the actuator connector portion 72 through the entry portion 304 and into the connector receiving portion 302, and to resist outward movement of the actuator connector portion 72 from the connector receiving portion 302 through the entry portion 304. Specifically, the retainer member 402 is a resiliently deflectable finger extending into the entry portion 304. The finger has a distal end 404 positioned adjacent the connector receiving portion 302. As illustrated, the distal end 404 is positioned at the second end 312 of the entry portion 304 where it opens to the connector receiving portion 304.

As a result of the angling of the finger 402, the actuator connector portion 72 can cam and deflect the finger 402 as it moves through the entry portion 304. However, if the actuator connector portion 72 attempts to move in the opposite direction from the connector receiving portion 302, the actuator connector portion 72 will be pushed up towards the opposite side of the entry portion 304. This effectively "closes" the entry portion 304 off and prevents the actuator connector portion 72 from unintentionally coming out of the receiving space 42a.

Other structures may be used in place of the one illustrated. For example, the finger 402 can be located up at the first end 310 of the entry portion 304. Likewise, other structures can be used. Further, the retainer 400 may be formed of any material, such as plastic or metal, and may be mounted as a separate component, or be mounted by integrally forming as part of the hook 300.

The foregoing embodiments have been provided solely for illustrating the structural and functional principles of the present invention and in no way are intended to be limiting. To the contrary, the present invention is intended to encompass all modifications, alterations, variations, substitutions, and equivalents within the spirit and scope of the following claims.

What is claimed is:

1. In combination with a motor vehicle having brakes that are actuated to prevent vehicle wheel rotation and hence rolling movement of said vehicle, a brake actuating system comprising:

a cable system operatively connected to the brakes such that increasing tension in the cable system actuates the brakes, and then decreasing tension in the cable system de-actuates the brakes, the cable system including an input cable;

a cable connector including a cable connector portion connected to a proximal end of the input cable, an actuator connector portion extending generally transversely to a longitudinal extent of the input cable, and at least one arm extending between the cable connector portion and the actuator connector portion;

an actuator including an output member movable in a brake applying direction and a brake releasing direction, the output member including a receiving space having (a) a connector receiving portion having first and second ends and (b) an entry portion having first and second ends;

the first end of the entry portion being open in a direction substantially parallel to the brake applying and releasing directions to an edge of the output member and the second end of the entry portion being open to the connector receiving portion, the receiving space being configured to enable the actuator connector portion to be passed into the first end of the entry portion and then through the second end thereof into the connector receiving portion, wherein at least the second end of the connector receiving portion is spaced from the second end of the entry portion;

the cable connector operatively connecting the input cable to the output member of the actuator to enable movement of the output member in the brake applying and releasing directions thereof to increase and decrease the tension in the cable system via the input cable with the actuator connector portion engaging the first end of the connector receiving portion as the output member is moved in the brake applying and releasing directions thereof.

2. A brake actuating system according to claim 1, a wear protector attached to one of the actuator connector portion and a surface defining the receiving space on the output member, the wear protector being formed of a wear resistant material.

3. A brake actuating system according to claim 1, wherein the at least one arm includes two arms each having an end, the ends being spread apart from one another and being connected to opposing ends of the actuator connector portion.

4. A brake actuating system for use in a motor vehicle having brakes that are actuated to prevent vehicle wheel rotation and hence rolling movement of the vehicle, the vehicle having a cable system operatively connected to the brake system such that increasing tension in the cable system actuates the brakes, and then decreasing tension in the cable system de-actuates the brakes; the brake actuating system comprising:

an input cable having a proximal end and a distal end;

an output side cable connector connected to the distal end of the input cable and being constructed to operatively connect the input cable to the cable system of the vehicle; and an input side cable connector including a cable connector portion connected to the proximal end of the input cable, an actuator connector portion extending generally transversely to a longitudinal extent of the input cable, and at least one arm extending between the cable connector portion and the actuator connector portion;

an actuator including an output member movable in a brake applying direction and a brake releasing direction, the output member including a receiving space having (a) a connector receiving portion having first and second ends and (b) an entry portion having first and second ends;

the first end of the entry portion being open in a direction substantially parallel to the brake applying and releasing directions to an edge of the output member and the second end of the entry portion being open to the connector receiving portion, the receiving space being configured to enable the actuator connector portion to be passed into the first end of the entry portion and then through the second end thereof into the connector receiving portion, wherein at least the second end of the connector receiving portion is spaced from the second end of the entry portion;

the input side cable connector being constructed to operatively connect the input cable to the actuator to increase and decrease the tension in the cable system via the input cable and the output side cable connector with the actuator connector portion engaging the first end of the connector receiving portion as the output member is moved in the brake applying and releasing directions thereof.

5. A brake actuating system according to claim 4, a wear protector attached to one of the actuator connector portion and a surface defining the receiving space on the output member, the wear protector being formed of a wear resistant material.

6. A brake actuating system according to claim 4, wherein the at least one arm includes two arms each having an end, the ends being spread apart from one another and being connected to opposing ends of the actuator connector portion.

7. In combination with a motor vehicle having brakes that are actuated to prevent vehicle wheel rotation and hence rolling movement of said vehicle, a brake actuating system comprising:

a cable system operatively connected to the brakes such that increasing tension in the cable system actuates the brakes, and then decreasing tension in the cable system de-actuates the brakes, the cable system including an input cable; and a cable connector including a cable connector portion connected to a proximal end of the input cable, an actuator connector portion extending generally transversely to a longitudinal extent of the input cable, and at least one arm extending between the cable connector portion and the actuator connector portion;

an actuator including an output member movable in a brake applying direction and a brake releasing direction, the output member including a receiving space having (a) a connector receiving portion and (b) an entry portion;

the entry portion being open in a direction substantially parallel to the brake applying and releasing directions to an edge of the output member and the connector receiving portion, the receiving space being configured to enable the actuator connector portion to be passed into the entry portion and then into the connector receiving portion;

the cable connector operatively connecting the input cable to the output member of the actuator to enable movement of the output member in the brake applying and releasing directions thereof to increase and decrease the tension in the cable system via the input cable; and a retainer mounted to the actuator and having a resiliently deflectable retainer member extending with respect to the receiving space, the retainer member being positioned to enable inward movement of the actuator connector portion through the entry portion and into the connector receiving portion, and to resist outward movement of the actuator connector portion from the connector receiving portion through the entry portion.

8. A brake actuating system according to claim 7, wherein the retainer member is a resiliently deflectable finger extending into the entry portion.

9. A brake actuating system according to claim 8, wherein the finger has a distal free end positioned adjacent the connector receiving portion.

10. A brake actuating system for use in a motor vehicle having brakes that are actuated to prevent vehicle wheel rotation and hence rolling movement of the vehicle, the vehicle having a cable system operatively connected to the brake system such that increasing tension in the cable system actuates the brakes, and then decreasing tension in the cable system de-actuates the brakes; the brake actuating system comprising:

an input cable having a proximal end and a distal end;

an output side cable connector connected to the distal end of the input cable and being constructed to operatively connect the input cable to the cable system of the vehicle;

an input side cable connector including a cable connector portion connected to the proximal end of the input cable, an actuator connector portion extending generally transversely to a longitudinal extent of the input cable, and at least one arm extending between the cable connector portion and the actuator connector portion;

an actuator including an output member movable in a brake applying direction and a brake releasing direction, the output member including a receiving space having (a) a connector receiving portion and (b) an entry portion;

the entry portion being open in a direction substantially parallel to the brake applying and releasing directions to an edge of the output member and the connector receiving portion, the receiving space being configured to enable the actuator connector portion to be passed into the entry portion and then into the connector receiving portion;

the input side cable connector being constructed to operatively connect the input cable to the actuator to enable movement of the output member in the brake applying and releasing directions thereof to increase the tension in the cable system via the input cable; and a retainer mounted to the actuator and having a resiliently deflectable retainer member extending into the receiving space, the retainer member being positioned to enable inward movement of the actuator connector portion through the entry portion and into the connector receiving portion, and to resist outward movement of the actuator connector portion through the entry portion.

11. A brake actuating system according to claim 10, wherein the retainer member is a resiliently deflectable finger extending into the entry portion.

12. A brake actuating system according to claim 11, wherein the finger has a distal free end positioned adjacent the connector receiving portion.

13. A brake actuating system according to claim 7, wherein the resiliently deflectable retainer member has a fixed end and is formed of a resiliently deflectable material.

14. A brake actuating system according to claim 10, wherein the resiliently deflectable retainer has a fixed end and is formed of a resiliently deflectable material.

15. A brake actuating system according to claim 1, wherein the cable connector portion, the actuator connector portion, and the at least one arm of the cable connector are formed integrally together.

16. A brake actuating system according to claim 4, wherein the cable connector portion, the actuator connector portion, and the at least one arm of the cable connector are formed integrally together.

17. A brake actuating system according to claim 7, wherein the cable connector portion, the actuator connector portion, and the at least one arm of the cable connector are formed integrally together.

18. A brake actuating system according to claim 10, wherein the cable connector portion, the actuator connector portion, and the at least one arm of the cable connector are formed integrally together.

19. A brake actuating system according to claim 1, wherein the edge of the output member to which the first end of the entry position of the receiving space is open is an outer peripheral edge of the output member.

20. A brake actuating system according to claim 4, wherein the edge of the output member to which the first end of the entry position of the receiving space is open is an outer peripheral edge of the output member.

21. A brake actuating system according to claim 7, wherein the edge of the output member to which the entry portion is open is an outer peripheral edge of the output member.

22. A brake actuating system according to claim 10, wherein the edge of the output member to which the entry portion is open is an outer peripheral edge of the output member.

* * * * *